United States Patent
Romero

(10) Patent No.: US 8,121,562 B2
(45) Date of Patent: Feb. 21, 2012

(54) TRANSMITTER AND HYBRID COMMUNICATION METHOD FOR CAPACITY OPTIMIZATION AND OUTAGE MINIMIZATION

(75) Inventor: Ric Romero, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 538 days.

(21) Appl. No.: 12/394,294

(22) Filed: Feb. 27, 2009

(65) Prior Publication Data

US 2010/0222004 A1    Sep. 2, 2010

(51) Int. Cl.
    *H03B 1/04*    (2006.01)
(52) U.S. Cl. .................. 455/127.2; 455/127.5; 455/572
(58) Field of Classification Search .................. None
    See application file for complete search history.

(56) References Cited

U.S. PATENT DOCUMENTS

2005/0213682 A1* 9/2005 Han et al. .............. 375/267

* cited by examiner

*Primary Examiner* — An Luu
(74) *Attorney, Agent, or Firm* — Schwegman, Lundberg & Woessner, P.A.; Gregory J. Gorrie

(57) ABSTRACT

Embodiments of a system and method for communicating over a fading channel are generally described herein. A transmitter uses a water-filling technique at lower power levels when the channel is not experiencing fading and uses channel-inversion technique at higher power levels when the channel is experiencing some fading. The transmitter refrains from communicating when the channel is experiencing deep fading. An average transmit power specification is maintained over a predetermined period of time even though transmissions using the channel-inversion technique may significantly exceed the average transmit power specification.

17 Claims, 3 Drawing Sheets

TRANSMITTER AND HYBRID COMMUNICATION METHOD FOR CAPACITY OPTIMIZATION AND OUTAGE MINIMIZATION

TECHNICAL FIELD

Embodiments pertain to wireless and radio-frequency (RF) communications. Some embodiments pertain to transmitters. Some embodiments pertain to communication systems that operate in a fading environment.

BACKGROUND

One difficulty with wireless communications is fading. Fading may result in temporary degradation and/or failure of communications due to the drop in the channel's signal-to-noise ratio (SNR). Slow fading arises when the coherence time of the channel is large relative to the delay constraint of the channel. In this situation, the amplitude and phase change imposed by the channel can be considered roughly constant over a period of use. Slow fading can be caused by events such as shadowing, where a large obstruction such as a hill or large building obscures the main signal path between the transmitter and the receiver.

Thus, there are general needs for systems and methods that are responsive to a slow fading channel. There are also general needs for systems and methods that can maintain a fairly consistent link between a transmitter and receiver in a fading environment. There are also general needs for systems and methods that can exploit a fading channel when channel-conditions are good but can preserve the communication link when channel conditions degrade. There are also general needs for systems and methods that optimize communications over a fading channel while maintaining an average power constraint.

SUMMARY

Embodiments of a system and method for communicating over a fading channel are generally described herein. A transmitter uses water-filling technique at lower-power levels when the channel is not experiencing fading. The transmitter uses channel-inversion technique at higher-power levels when the channel is experiencing some fading. The transmitter refrains from communicating when the channel is experiencing deep fading. An average transmit power specification is maintained even though transmissions using the channel-inversion technique may significantly exceed the average transmit power specification.

DETAILED DESCRIPTION

The following description and the drawings sufficiently illustrate specific embodiments to enable those skilled in the art to practice them. Other embodiments may incorporate structural, logical, electrical, process, and other changes. Examples merely typify possible variations. Individual components and functions are optional unless explicitly required, and the sequence of operations may vary. Portions and features of some embodiments may be included in, or substituted for, those of other embodiments. Embodiments set forth in the claims encompass all available equivalents of those claims.

Figure 1:
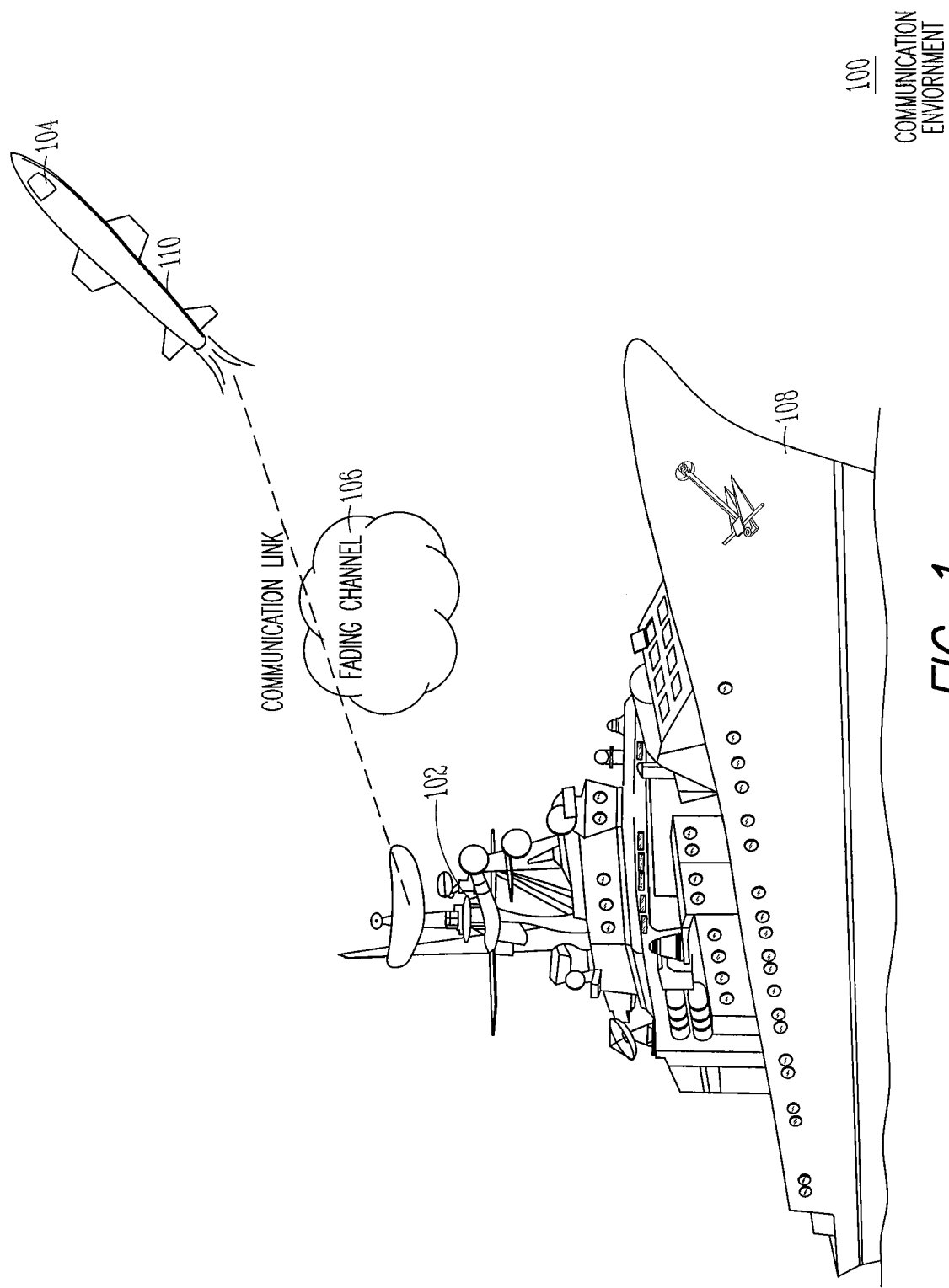
FIG. 1 illustrates a communication environment in accordance with some embodiments.

FIG. 1 illustrates a communication environment in accordance with some embodiments. Communication environment 100 includes transmitter 102, receiver 104 and channel 106. Channel 106 may be a fading channel through which transmitter 102 and receiver 104 may communicate. In some embodiments, transmitter 102 may be located on launch platform 108, such as a ship, and receiver 104 may be located on mobile platform 110, such as a missile or other airborne platform, although the scope of the embodiments is not limited in this respect as transmitter and receiver may be part of any wireless communication devices.

In accordance with embodiments, receiver 104 may provide transmitter 102 with a gain estimate of channel 106 (i.e., the channel gain estimate). The channel gain estimate may be an estimate of the channel gain for a particular period of time (e.g., a time block), which may be less than the coherence time of channel 106. Transmitter 102 is configured to transmit in accordance with a water-filling technique when channel conditions are good (i.e., the channel is not experiencing fading). Transmitter 102 is configured to transmit in accordance with a channel-inversion technique when channel conditions are not so good (i.e., the channel is experiencing fading). Transmitter 102 is configured to refrain from transmitting when channel conditions are exceptionally poor (i.e., the channel is experiencing deep fading).

Transmitter 102 may transmit in accordance with the water-filling technique when the channel gain estimate is greater than a channel gain estimate threshold. Transmitter 102 may transmit in accordance with the channel-inversion technique when the channel gain estimate is less than or equal to the channel gain estimate threshold but greater than a worst-case channel gain threshold. Transmitter 102 may refrain from transmitting when the channel gain estimate is less than or equal to the worst-case channel gain threshold. In these embodiments, transmitter 102 may maintain an average transmit power output of no greater than an average transmit power level specified in an average transmit power specification. The average transmit power specification may be maintained over a predetermined period of time when using these techniques.

In these embodiments, channel 106 may be a slow fading channel such that the coherence time of channel 106 is large relative to the delay constraint of channel 106. This allows the channel gain estimate to be considered fairly constant over any particular time block. In other words, the coherence time of the channel is greater than a time block. During each time block, transmitter 102 may determine whether to transmit in accordance with the water-filling technique or the channel-inversion technique, or transmitter 102 may determine whether to refrain from transmitting based on the channel gain estimate.

In some embodiments, transmitter 102 may transmit a high-bandwidth pulse to probe fading channel 106, and receiver 104 may generate and provide the channel gain estimate to transmitter 102 (e.g., in the form of feedback bits) in response to receipt of the pulse. Other techniques to estimate the channel gain are also suitable for use.

In some embodiments, a communication system for communicating between launch platform 108 and mobile platform 110 over a slow fading channel is provided. In these embodiments, the communication system may include receiver 104 located on mobile platform 110 and transmitter 102 located on launch platform 108. Receiver 104 may provide a channel gain estimate for the slow fading channel. Transmitter 102 may transmit data to receiver 104 in accordance with the water-filling technique when the channel gain estimate is greater than the channel gain estimate threshold. Transmitter 102 may transmit data to receiver 104 in accordance with the channel-inversion technique when the channel gain estimate is less than or equal to the channel gain estimate threshold but greater than the worst-case channel gain threshold. Transmitter 102 may also maintain an average transmit power output of no greater than an average transmit power level specified in an average transmit power specification over a mission time period (i.e., until mobile platform 110 reaches its target).

In some of these embodiments, transmitter 102 and/or receiver 104 may be part of a software-defined cognitive radio that is configured to change its transmission or reception parameters to communicate efficiently avoiding interference with licensed or unlicensed users.

In other embodiments, either transmitter 102 or receiver 104 may be part of a portable wireless communication device, such as a personal digital assistant (PDA), a laptop or portable computer with wireless communication capability, a web tablet, a mobile telephone, a wireless headset, a pager, an instant messaging device, an access point or other device that may receive and/or transmit information wirelessly. In these embodiments, either transmitter 102 or receiver 104 may be part of a broadband wireless access (BWA) network communication station, such as a Worldwide Interoperability for Microwave Access (WiMAX) communication station or a UTRAN Long-Term-Evolution (LTE) communication station, although the scope of the embodiments is not limited in this respect as either transmitter 102 or receiver 104 may be part of almost any wireless communication device.

Figure 2:
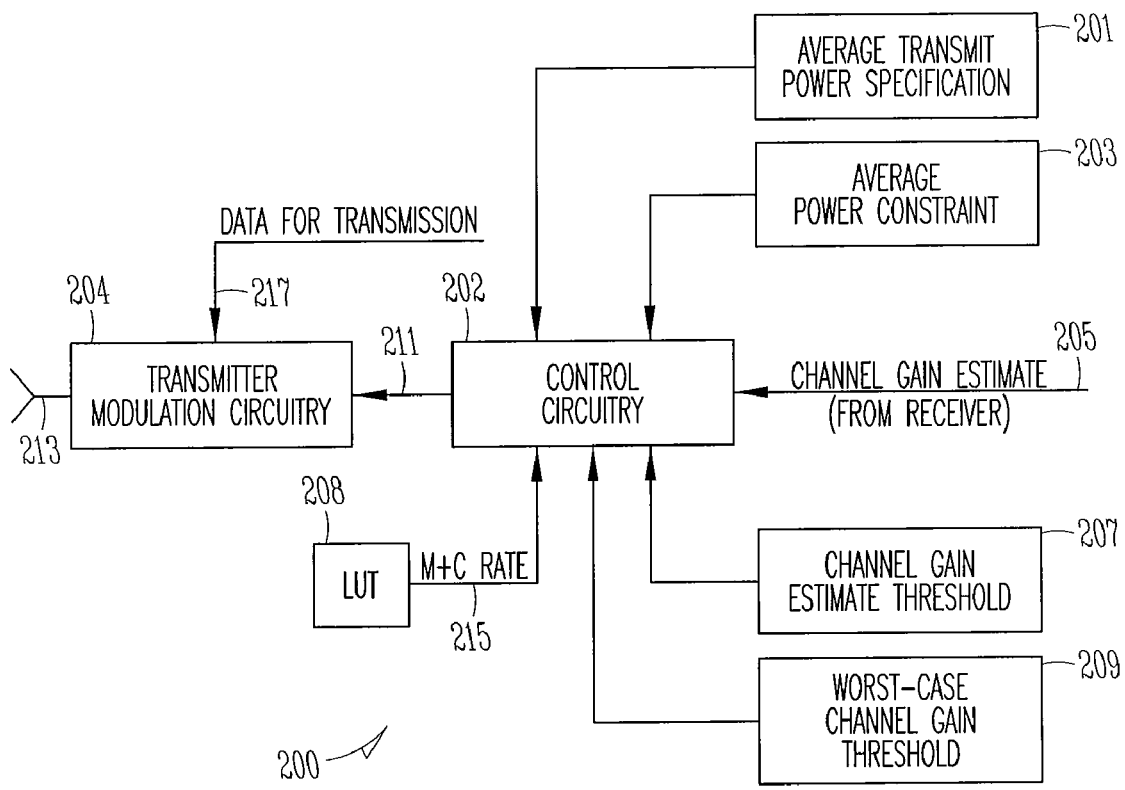
FIG. 2 is a functional block diagram of a transmitter in accordance with some embodiments.

FIG. 2 is a functional block diagram of a transmitter in accordance with some embodiments. Transmitter 200 may be suitable for use as transmitter 102 (FIG. 1), although other transmitter configurations may also be suitable. Transmitter 200 may include control circuitry 202 and transmitter modulation circuitry 204. Transmitter modulation circuitry 204 may modulate data 217 for transmission over a communication link to a receiver, such as receiver 104 (FIG. 1), in accordance with control signal 211 provided by control circuitry 202. Transmitter 200 may also include storage elements for storing average transmit power specification 201, average power constraint 203, channel gain estimate threshold 207, and worst-case channel gain threshold 209. Transmitter 200 may also include a storage element for storing look-up-table (LUT) 208. Transmitter 200 may include other functional elements that are not illustrated.

In accordance with embodiments, control circuitry 202 configures transmitter modulation circuitry 204 to transmit in accordance with either a water-filling technique or a channel-inversion technique based on channel gain estimate 205. In these embodiments, control circuitry 202 configures transmitter modulation circuitry 204 to transmit in accordance with the water-filling technique when channel gain estimate 205 is greater than channel gain estimate threshold 207. Control circuitry 202 configures transmitter modulation circuitry 204 to transmit in accordance with the channel-inversion technique when channel gain estimate 205 is less than or equal to channel gain estimate threshold 207 but greater than worst-case channel gain threshold 209. Control circuitry 202 also configures transmitter modulation circuitry 204 to maintain average transmit power output 213 to be no greater than an average transmit power level specified in average transmit power specification 201 over a predetermined period of time. Average transmit power specification 201 may be maintained when transmitting in accordance with the water-filling technique or the channel-inversion technique, or when refraining from transmitting.

In some embodiments, control circuitry 202 may configure transmitter modulation circuitry 204 to transmit in accordance with the water-filling technique based on average power constraint 203, and may configure transmitter modulation circuitry 204 to transmit in accordance with the channel-inversion technique without regard to average power constraint 203. When transmitter modulation circuitry 204 is configured to transmit in accordance with the channel-inversion technique, transmitter modulation circuitry 204 may be configured to transmit at a transmit power level that exceeds the average transmit power level specified in average transmit power specification 201. When transmitter modulation circuitry 204 is configured to transmit in accordance with the water-filling technique, transmitter modulation circuitry 204 may transmit at a transmit power level in accordance with average power constraint 203. Average power constraint 203 may be substantially less than the average transmit power level specified in average transmit power specification 201. Average power constraint 203 may be selected such that a bit error rate is preserved (i.e., to maintain a link margin). Average transmit power specification 201 may be the mean power that transmitter 200 can maintain and may, for example, be a function of the power source and/or the power amplifier.

The use of average power constraint 203 that is less than the average transmit power level specified in average transmit power specification 201 when channel conditions are good provides a reserve that allows transmissions at higher transmit power levels using the channel-inversion technique when the channel is experiencing fading so that an average power level no greater than the average transmit power level specified in average transmit power specification 201 can be maintained. This allows transmit power levels to significantly exceed the average transmit power level specified in average transmit power specification 201 when transmitting in accordance with the channel-inversion technique. In this way, a fairly consistent link can be maintained between transmitter 200 and a receiver, such as receiver 104 (FIG. 1), even when the channel significantly fades.

In some embodiments, control circuitry 202 provides control signal 211 to transmitter modulation circuitry 204 to configure transmitter modulation circuitry 204 to transmit in accordance with either the water-filling technique or the channel-inversion technique. Control circuitry 202 may also provide average power constraint 203 for use by transmitter modulation circuitry 204 in transmitting in accordance with the water-filling technique. Control circuitry 202 may also provide a transmit power level for use by transmitter modulation circuitry 204 in transmitting in accordance with the channel-inversion technique.

For example, if the average transmit power level specified in average transmit power specification 201 is 100 Watts (W), average power constraint 203 when transmitting in accordance with the water-filling technique may be as low as 10 W. This allows the transmit power level to exceed 100 W when transmitting in accordance with the channel-inversion technique. Average transmit power specification 201 and average power constraint 203 may be predetermined (i.e., for a particular transmitter design or mission). Channel gain estimate threshold 207 and worst-case channel gain threshold 209 may also be predetermined or may be selected dynamically based on throughput requirements of the communication link or the mission.

Control circuitry 202 may also configure transmitter modulation circuitry 204 to refrain from transmitting when channel gain estimate 205 is less than worst-case channel gain threshold 209. In these embodiments, the average transmit power output 213 of no greater than the average transmit power level specified in average transmit power specification 201 may be maintained over the predetermined period of time including time blocks when transmitter modulation circuitry 204 is configured to refrain from transmitting. This is the case when the channel is experiencing significant fading. Refraining from transmitting not only preserves power and reduces energy consumption, it also provides an additional reserve in terms of meeting average transmit power specification 201. This reserve allows the transmit power to significantly exceed average transmit power level specified in average transmit power specification 201 when transmitting in accordance with the channel-inversion technique.

When control circuitry 202 configures transmitter modulation circuitry 204 to transmit in accordance with the water-filling technique, control circuitry 202 may select a modulation level and/or coding rate 215 based on channel gain estimate 205 using average power constraint 203 to either maximize throughput or meet a predetermined data rate. Control circuitry 202 may also configure transmitter modulation circuitry 204 to transmit at a power level in accordance with average power constraint 203. In some embodiments, the modulation level and/or a coding rate may be selected from LUT 208. In some alternate embodiments, the transmit power level may be changed when transmitting in accordance with the water-filling technique when a predetermined throughput or data rate can be maintained based on channel gain estimate 205.

When control circuitry 202 configures transmitter modulation circuitry 204 to transmit in accordance with the channel-inversion technique, control circuitry 202 instructs transmitter modulation circuitry 204 to increase the transmit power level to at least in part compensate for a reduced channel gain indicated by channel gain estimate 205. The increased transmit power may be selected to be at or below a maximum output of a power amplifier of transmitter modulation circuitry 204. For example, if channel gain estimate 205 indicates that the channel gain is currently 10 dB less (e.g., than channel gain estimate threshold 207), control circuitry 202 may instruct transmitter modulation circuitry 204 to increase the transmit power level by 10 dB. In some embodiments, when transmitting in accordance with the channel-inversion technique, modulation level and/or coding rate 215 may also be selected to provide a reduced or lower throughput or data rate.

In some embodiments, transmitter 200 may dynamically respond to changes in the channel gain. In these embodiments, control circuitry 202 may cause transmitter modulation circuitry 204 to switch from the water-filling technique to the channel-inversion technique when channel gain estimate 205 falls below channel gain estimate threshold 207. In these embodiments, control circuitry 202 may also cause transmitter modulation circuitry 204 to switch to the water-filling technique from the channel-inversion technique when channel gain estimate 205 improves to a level above channel gain estimate threshold 207.

In some embodiments, transmitter modulation circuitry 204 may transmit in accordance with the water-filling technique when channel gain estimate 205 is greater than the channel gain estimate threshold 207 during a current time block. Transmitter modulation circuitry 204 may also transmit in accordance with the channel-inversion technique during the current time block when channel gain estimate 205 is less than channel gain estimate threshold 207 but greater than worst-case channel gain threshold 209 during the current time block. Average transmit power output 213 of no greater than average power level specified in average transmit power specification 201 may be maintained over a plurality of time blocks including the current time block. The current time block may comprise a predetermined period of time when using the water-filling technique, when using the channel-inversion technique or when refraining from transmitting. Each time block may be less than coherence time of channel 106 (FIG. 1).

In embodiments in which transmitter 200 is located on launch platform 108 (FIG. 1) and receiver 104 (FIG. 1) is located on mobile platform 110 (FIG. 1) (such as a missile), control circuitry 202 configures transmitter modulation circuitry 204 to maintain average transmit power output 213 of no greater than the level specified in average transmit power specification 201 over the mission time period when using the water-filling technique or the channel-inversion technique, or when refraining from transmitting.

In some embodiments, a modulation type, such as a phase-shift keying (PSK) modulation type, may be preselected for use during transmissions in accordance with the water-filling technique. The modulation type may be maintained during transmissions in accordance with the water-filling technique while the modulation level, coding rate and/or power level may be modified by control circuitry 202 in response to channel gain estimate 205.

The use of the water-filling technique when a channel gain estimate is greater than a channel gain estimate threshold, and the use of the channel-inversion technique when the channel gain estimate is less than or equal to the channel gain estimate threshold but greater than a worst-case channel gain threshold allows the channel capacity to be near optimum while minimizing the effect of channel outages. Furthermore, an average transmit power output of no greater than the average power level specified in average transmit power specification 201 may also be maintained while optimizing channel capacity and minimizing outages.

Although transmitter 200 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, application specific integrated circuits (ASICs), radio-frequency integrated circuits (RFICs) and combinations of various hardware and logic circuitry for performing at least the functions described herein. In some embodiments, the functional elements of transmitter 200 may refer to one or more processes operating on one or more processing elements.

Figure 3:
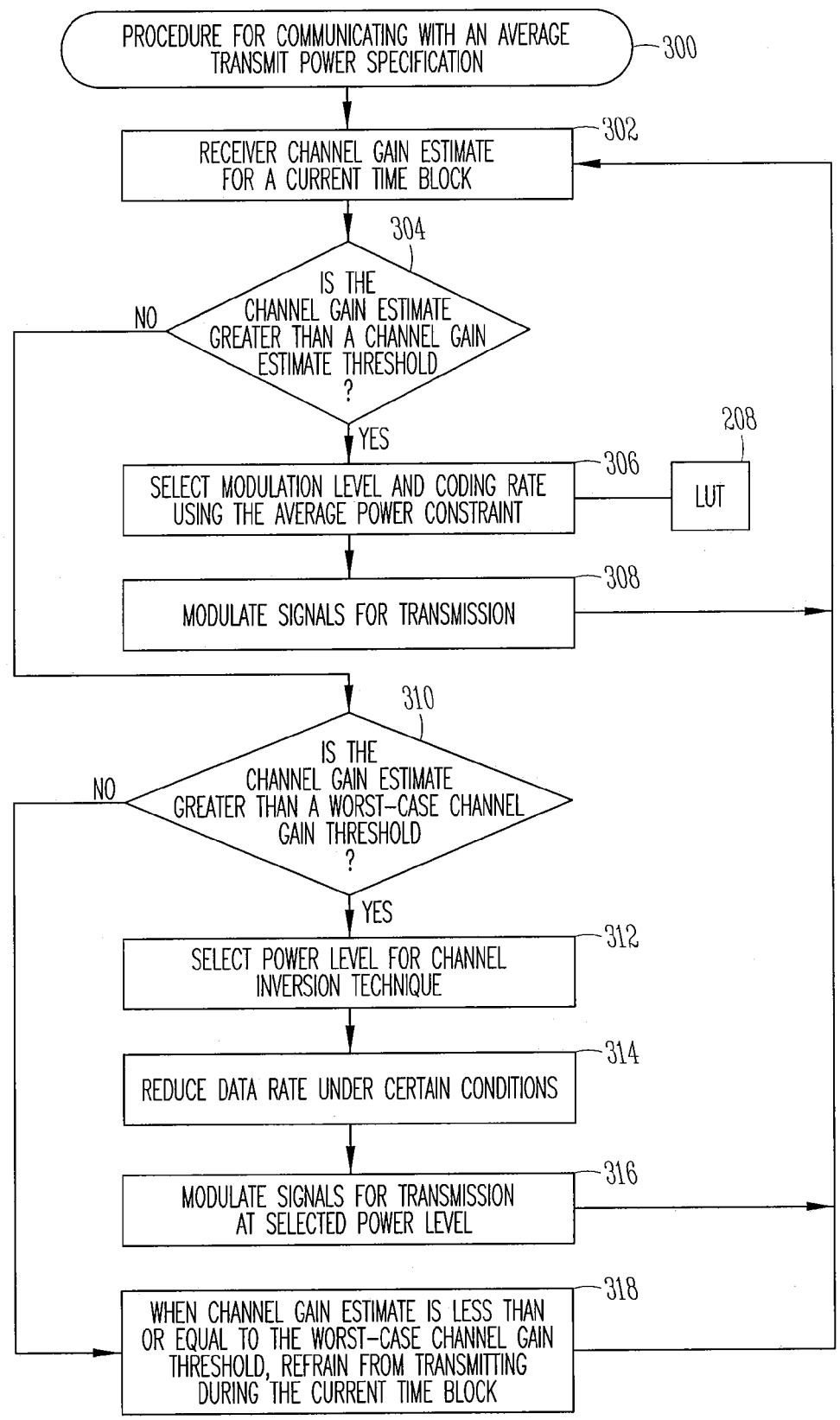
FIG. 3 is a flow chart of a procedure for communicating with an average transmit power specification in accordance with some embodiments.

FIG. 3 is a flow chart of a procedure for communicating with an average transmit power specification in accordance with some embodiments. Procedure 300 may be performed by a transmitter, such as transmitter 200 (FIG. 2), although other transmitter configurations may also be suitable. Procedure 300 is a hybrid communication procedure that may optimize capacity and minimize outages through the use of the water-filling technique and the channel-inversion technique.

In operation 302, a channel gain estimate for a current time block is received. In some embodiments, the channel gain estimate may be received from a receiver, such as receiver 104 (FIG. 1).

Operation 304 determines if the channel gain estimate is greater than a channel gain estimate threshold. When the channel gain estimate is greater than the channel gain estimate threshold, the channel is not experiencing fading and operation 306 is performed. When the channel gain estimate is not greater than the channel gain estimate threshold, the channel is experiencing fading and operation 310 is performed.

In operation 306, a modulation level and/or coding rate are selected based on the average power constraint for use in transmitting in accordance with the water-filling technique. In some embodiments, the modulation level and coding rate may be selected from LUT 208.

In operation 308, signals are modulated for transmission based on the selected modulation level and coding rate using the average power constraint. After operation 308, procedure 300 returns to operation 302 to determine the transmission technique for the next time block.

Operation 310 determines whether the channel gain estimate is greater than the worst-case channel gain threshold. When the channel gain estimate is greater than the worst-case channel gain threshold, operation 312 is performed. When the channel gain estimate is not greater than the worst-case channel gain threshold, operation 318 is performed.

In operation 312, a transmit power level is selected for communicating in accordance with the channel-inversion technique. The transmit power level may be selected to compensate for a reduction in the channel gain. The transmit power level may be selected to be less than the maximum desired output of the power amplifier or a maximum power consumption level (i.e., a peak-power level of the transmitter modulation circuitry).

In operation 314, the data rate may be reduced, for example, when the transmit power level needed to compensate for the reduction in channel gain exceeds the maximum desired output of the power amplifier or a maximum power consumption level.

In operation 316, signals for transmission are modulated for transmission at the selected power level. After operation 316, procedure 300 returns to operation 302 to determine the transmission technique for the next time block.

In operation 318, the channel gain estimate is less than or equal to worst-case channel gain threshold (i.e., the channel is experiencing deep fading). Accordingly, the transmitter is configured to refrain from transmitting during the current time block. When operation 318 is performed, the transmit power to effectively communicate may exceed the maximum or peak power level that the transmitter modulation circuitry would be capable of reliably providing. After operation 318, procedure 300 returns to operation 302 to determine the transmission technique for the next time block.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A transmitter comprising transmitter modulation circuitry and control circuitry, wherein the control circuitry configures the transmitter modulation circuitry to transmit in accordance with a water-filling technique when a channel gain estimate is greater than a channel gain estimate threshold,
   wherein the control circuitry configures the transmitter modulation circuitry to transmit in accordance with a channel-inversion technique when the channel gain estimate is less than or equal to the channel gain estimate threshold but greater than a worst-case channel gain threshold, and
   wherein an average transmit power output of no greater than an average transmit power level specified in an average transmit power specification is maintained.

2. The transmitter of claim 1 wherein the control circuitry configures the transmitter modulation circuitry to transmit in accordance with the water-filling technique based on an average power constraint,
   wherein the control circuitry configures the transmitter modulation circuitry to transmit in accordance with the channel-inversion technique without regard to the average power constraint, and
   wherein the average power constraint is less than the average transmit power level specified in the average transmit power specification.

3. The transmitter of claim 2 wherein when the transmitter modulation circuitry is configured to transmit in accordance with the channel-inversion technique, the transmitter modulation circuitry is configured to transmit at a transmit power level that exceeds an average transmit power level specified in the average transmit power specification, and
   wherein when the transmitter modulation circuitry is configured to transmit in accordance with the water-filling technique, the transmitter modulation circuitry transmits at a transmit power level in accordance with the average power constraint.

4. The transmitter of claim 3 wherein the control circuitry further configures the transmitter modulation circuitry to refrain from transmitting when the channel gain estimate is less than the worst-case channel gain threshold, and
   wherein the average transmit power output of no greater than the average transmit power level specified in the average transmit power specification is maintained over a predetermined period of time including time blocks when the transmitter modulation circuitry is configured to refrain from transmitting.

5. The transmitter of claim 4 wherein when the control circuitry configures the transmitter modulation circuitry to transmit in accordance with the water-filling technique, the control circuitry:
   selects a modulation level and a coding rate based on the channel gain estimate using the average power constraint; and
   configures the transmitter modulation circuitry to transmit at a power level in accordance with the average power constraint.

6. The transmitter of claim 5 wherein when the control circuitry configures the transmitter modulation circuitry to transmit in accordance with the channel-inversion technique, the control circuitry instructs the transmitter modulation circuitry to increase a transmit power level to at least in part compensate for a reduced channel gain indicated by the channel gain estimate, the increased transmit power selected to be at or below a maximum output of a power amplifier of the transmitter modulation circuitry.

7. The transmitter of claim 6 wherein the control circuitry is configured to cause the transmitter modulation circuitry to switch from the water-filling technique to the channel-inversion technique when the channel gain estimate falls below the channel gain estimate threshold, and
   wherein the control circuitry is configured to cause the transmitter modulation circuitry to switch to the water-filling technique from the channel-inversion technique when the channel gain estimate improves to a level above the channel gain estimate threshold.

8. The transmitter of claim 7 wherein the transmitter modulation circuitry is configured to transmit in accordance with the water-filling technique when the channel gain estimate during a current time block is greater than the channel gain estimate threshold, wherein the transmitter modulation circuitry is configured to transmit in accordance with the channel-inversion technique during the current time block when the channel gain estimate is less than the channel gain estimate threshold but greater than a worst-case channel gain threshold during the current time block, and wherein the transmitter modulation circuitry is further configured to maintain the average transmit power output of no greater than an average power level specified in the average transmit power specification over a plurality of time blocks including the current time block comprising the predetermined period of time when using the water-filling technique, when using the channel-inversion technique or when refraining from transmitting during the time blocks.

9. The transmitter of claim 8, wherein the transmitter is configured to transmit data to a receiver over a fading channel,
wherein the transmitter is configured to transmit a pulse to probe the channel, and
wherein the receiver is configured to generate and provide the channel gain estimate to the transmitter in response to receipt of the pulse.

10. A method of communicating over a fading channel comprising:
transmitting in accordance with a water-filling technique when a channel gain estimate for the fading channel is greater than a channel gain estimate threshold;
transmitting in accordance with a channel-inversion technique when the channel gain estimate is less than or equal to the channel gain estimate threshold but greater than a worst-case channel gain threshold; and
maintaining an average transmit power output of no greater than an average transmit power level specified in an average transmit power specification.

11. The method of claim 10 wherein transmitting in accordance with the water-filling technique comprises transmitting based on an average power constraint,
wherein transmitting in accordance with the channel-inversion technique comprises transmitting without regard to the average power constraint, and
wherein the average power constraint is less than the average transmit power level specified in the average transmit power specification.

12. The method of claim 11 wherein transmitting in accordance with the channel-inversion technique comprises transmitting at a transmit power level that exceeds an average transmit power level specified in the average transmit power specification, and
wherein transmitting in accordance with the water-filling technique comprises transmitting at a transmit power level in accordance with the average power constraint.

13. The method of claim 12 further comprising:
refraining from transmitting when the channel gain estimate is less than the worst-case channel gain threshold; and
maintaining average transmit power output of no greater than the average transmit power level specified in the average transmit power specification over a predetermined period of time including time blocks when the transmitter modulation circuitry is configured to refrain from transmitting.

14. The method of claim 13 wherein transmitting in accordance with the water-filling technique comprises:
selecting a modulation level and a coding rate based on the channel gain estimate using the average power constraint; and
transmitting at a power level in accordance with the average power constraint.

15. The method of claim 14 wherein transmitting in accordance with the channel-inversion technique comprises increasing a transmit power level to at least in part compensate for a reduced channel gain indicated by the channel gain estimate, the increased transmit power selected to be at or below a maximum output of a power amplifier of the transmitter modulation circuitry.

16. The method of claim 15 further comprising:
switching from the water-filling technique to the channel-inversion technique when the channel gain estimate falls below the channel gain estimate threshold; and
switching to the water-filling technique from the channel-inversion technique when the channel gain estimate improves to a level above the channel gain estimate threshold.

17. The method of claim 16 wherein transmitting comprises transmitting data to a receiver over a fading channel, and
wherein the method further comprises transmitting a pulse to probe the channel, and
wherein the receiver is configured to generate and provide the channel gain estimate in response to receipt of the pulse.

* * * * *